United States Patent [19]

Rozin et al.

[11] Patent Number: 5,847,447
[45] Date of Patent: Dec. 8, 1998

[54] CAPCITIVELY COUPLED BI-DIRECTIONAL DATA AND POWER TRANSMISSION SYSTEM

[75] Inventors: Alexander Rozin; George Kaplun, both of Jerusalem, Israel

[73] Assignee: Ambient Corporation, Jerusalem, Israel

[21] Appl. No.: 677,412

[22] Filed: Jul. 9, 1996

[51] Int. Cl.[6] .................................................. H01L 23/02
[52] U.S. Cl. .......................... 257/678; 257/679; 235/451
[58] Field of Search ................................... 257/679, 678; 235/379, 380, 351, 488, 492

[56] References Cited

U.S. PATENT DOCUMENTS

| 4,480,178 | 10/1984 | Miller, II et al. | 235/380 |
|---|---|---|---|
| 4,605,844 | 8/1986 | Haggan | 235/380 |
| 4,692,604 | 9/1987 | Billings | 235/493 |
| 4,797,541 | 1/1989 | Billings et al. | 235/449 |
| 4,798,322 | 1/1989 | Bernstein et al. | 235/487 |
| 4,818,855 | 4/1989 | Mongeon et al. | 235/440 |
| 4,829,166 | 5/1989 | Froelich | 235/379 |
| 4,876,535 | 10/1989 | Balmer et al. | 235/451 |
| 4,899,036 | 2/1990 | McCrindle et al. | 235/380 |
| 4,906,828 | 3/1990 | Halpern | 235/379 |
| 4,928,000 | 5/1990 | Eglise et al. | 235/380 |
| 5,220,158 | 6/1993 | Takahira et al. | 235/492 |
| 5,286,955 | 2/1994 | Klosa | 235/380 |
| 5,308,968 | 5/1994 | Yamaguchi | 235/492 |
| 5,321,240 | 6/1994 | Takahira | 235/380 |
| 5,347,263 | 9/1994 | Carroll et al. | 340/572 |
| 5,378,887 | 1/1995 | Kobayashi | 235/492 |
| 5,418,353 | 5/1995 | Katayama et al. | 235/380 |
| 5,418,358 | 5/1995 | Bruhnke et al. | 235/492 |
| 5,424,527 | 6/1995 | Takahira | 235/492 |
| 5,428,659 | 6/1995 | Renner et al. | 378/162 |
| 5,436,441 | 7/1995 | Inoue | 235/487 |
| 5,444,222 | 8/1995 | Inoue | 235/380 |
| 5,491,484 | 2/1996 | Schuermann | 342/51 |

*Primary Examiner*—Tom Thomas
*Assistant Examiner*—Roy Potter
*Attorney, Agent, or Firm*—Townsend and Townsend and Crew LLP

[57] ABSTRACT

A power and data transfer system includes a portable device with a first contact circuit formed from a pair of contact pads having an outer surface covered with a dielectric material. A processing unit is coupled to the first contact circuit. A host unit has a second contact circuit including a second pair of contact pads which are also covered with a dielectric material. A host processing unit is coupled to the second contact circuit. The first and second contact circuits are adapted to form a capacitive interface when the portable device is positioned proximate the host unit. The capacitive interface transmits power signals from the host unit to the portable device. The same contacts are used to transmit bi-directional data signals between the portable device and the host unit.

13 Claims, 4 Drawing Sheets

CAPCITIVELY COUPLED BI-DIRECTIONAL DATA AND POWER TRANSMISSION SYSTEM

BACKGROUND OF THE INVENTION

The present invention relates to systems and methods for transferring power and data between devices. In particular, the present invention relates to the transfer of power and data between a host unit and a portable data carrier.

Advances in electronics and packaging have led to the increasing use of small, portable data carriers which may be used to store and process information and which interface and communicate with larger host systems. One example of such a use are so-called "smart cards" which are becoming increasingly popular for a number of applications, including use as stored value cards, bank cards, identification cards, cable television authorization cards, etc. These smart cards generally include one or more microelectronic components embedded in a plastic card approximately the size of a typical credit card. Smart cards usually include a microprocessor to perform computing operations and some form of memory for information storage.

The cards typically interface with transaction terminals, such as automated teller machines (ATMs), and operate using power supplied from the terminal. Data is transmitted between the card and terminal. A card may be inserted into a terminal a sizeable number of times over the life of a card. Thus, there is a need for a card/terminal interface which can continue to efficiently transfer data and power despite being subject to a large number of uses.

Design of a card/terminal interface is further complicated by the need to accommodate the increasing power and data transfer requirements of new smart cards. The trend in these cards, and in other portable data carrier applications, is to provide greater processing and storage capabilities on the card. Unfortunately, progress in designing greater processing and storage on cards is impeded by the inability of existing designs to effectively transfer sufficient power to drive these high capacity cards. Thus, there is a need for an interface which provides increased power to the card while permitting data transfer at relatively high frequencies.

A number of smart card interface designs exist. Most cards currently use direct metallic contact between the card and terminal. These contacts, unfortunately, are subject to oxidation, corrosion, and contamination, all of which can degrade performance of the contact or even cause the short-circuiting of one or more contacts.

Some designs employ electromagnetic coupling schemes using transmitting and receiving coils in the terminal and in the card. These designs dissipate a relatively large amount of energy. In addition, the energy transfer efficiency of these types of interfaces is relatively low, making the design unsuited for the transfer of sufficient power to drive cards with large power requirements.

Other card designs use a capacitive interface between the card and terminal to transfer power. Capacitor plates are positioned on a surface of the card and corresponding plates are positioned in the terminal. When the card and terminal come into contact, the two plates form a capacitor over which power may be transferred. The power transferred by these capacitive interfaces is influenced by a number of variables, including: the value of the capacitance of the interface; the size of the power source; and the frequency of operation. Existing designs using capacitive coupling are not ideally suited for use with small card devices with relatively large power requirements for several reasons.

For example, existing designs suffer in that they tend to maximize the size of the capacitive plates used in order to increase the capacitive coupling of the interface. This uses valuable card surface space which could otherwise be used for identification purposes. Embossed information, photos, or the like are generally placed on one or more surfaces of these cards.

Further, existing designs suffer from degraded coupling as the cards are handled and bent. Normal use tends to increase the mechanical separation at the interface between the card and terminal. This decreases the coupling of the interface, thereby reducing power transfer efficiency.

Card designs which use a capacitive interface currently do not permit the bi-directional transfer of data signals over the capacitive interface. Instead, additional contacts are required to transfer data signals. This approach requires that additional space from the small surface area of these cards be committed to data contacts, consuming further valuable space on the face of the card which is typically needed for cardholder identification purposes.

Further still, existing capacitive interfaces tend to be inefficient in that the terminals continue to oscillate and generate alternating current (AC) power signals despite no card being coupled to the terminal. That is, existing designs generate electromagnetic and radio-frequency signals when not in use. It is desirable to reduce or eliminate such emissions when no card is inserted into a terminal.

Current designs also suffer due to their use of expensive and space-consuming analog to digital (A/D) and digital to analog (D/A) converter circuitry to receive and transmit data signals between the card and terminal. It would be desirable to simplify and reduce the cost of this circuitry while providing a design which allows high data transfer rates.

Thus, it would be desirable to provide a capacitively coupled interface which permits bi-directional data transfer using the same contacts which are used to supply power signals to a card. Preferably, the design should survive the bending and handling which tends to buckle the card and increase separation between the contacts while providing sufficient power and data transfer capacity to support cards with increased memory and processing capacities.

SUMMARY OF THE INVENTION

Accordingly, a power and data transfer system is provided which includes a portable device with a first contact circuit formed from a pair of contact pads having an outer surface covered with a dielectric material. The portable device has a processing unit on it coupled to the first contact circuit.

The portable device interfaces with a host unit which has a second contact circuit on it. The second contact circuit includes a second pair of contact pads which are also covered with a dielectric material. A host processing unit is coupled to the second contact circuit. The first and second contact circuits are adapted to form a capacitive interface when the portable device is positioned proximate the host unit. The capacitive interface transmits power signals from the host unit to the portable device. The same contacts are used to transmit bi-directional data signals between the portable device and the host unit.

In one embodiment of the invention, a matching capacitor is provided to increase the capacitive coupling between the host and the portable device.

In another embodiment, the host unit includes a portable device detector which senses when the portable device has been coupled to the host unit. If no portable device is present, the host unit is prevented from transmitting any signals over the interface, thereby avoiding the wasteful emission of unused electromagnetic or radio-frequency signals.

Embodiments of the present invention are capable of supplying relatively large amounts of power to small portable devices, thereby permitting the inclusion of increased memory or processing capability on the portable device.

For a fuller understanding of the nature and advantages of the invention, reference should be made to the ensuing description taken in conjunction with the accompanying drawings.

DESCRIPTION OF SPECIFIC EMBODIMENTS

Figure 1:
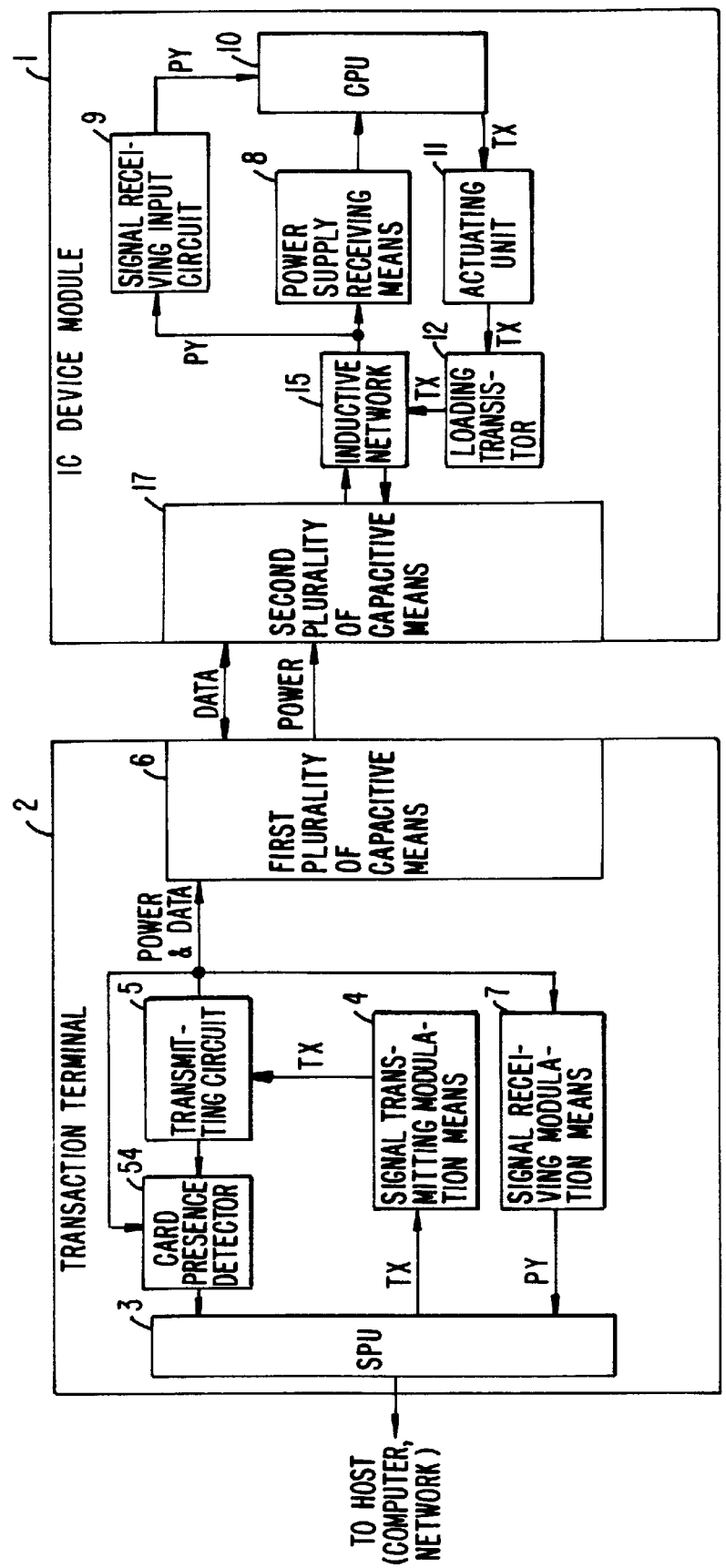
FIG. 1 is a block diagram depicting a terminal and a card employing the capacitive coupling and data and power transfer features of the present invention.

Features of embodiments of the present invention will now be described by first referring to FIG. 1, where a block diagram showing a transaction terminal 2 coupled to an integrated circuit (IC) card 1 is depicted. In one specific embodiment, IC card 1 is a smart card configured to store financial information or other data, while the transaction terminal 2 is an appropriately configured financial transaction terminal such as an Automated Teller Machine (ATM) adapted to interface with IC card 1. Those skilled in the art, upon reading this disclosure, will recognize that other types of cards and terminals (or portable units and host units) may incorporate features of the present invention. The use of an ATM terminal and a smart card is one specific embodiment and is given as an example to facilitate discussion of features of the invention.

The transaction terminal 2 includes terminal contact circuits 6 which permit the transfer of data and power on an alternating field to the IC card 1. The IC card 1 receives data and power from the transaction terminal 2 via contact circuits 17. Data may be transmitted from the terminal to the card (and from the card to the terminal) while power is supplied from the terminal to the card. Data signals, received on IC card contact circuits 17, pass through inductive network 15 to a signal receiving input circuit 9. Signal receiving input circuit 9 detects data signals carried on the alternating field received from the transaction terminal 2. These data signals are input to an IC card processing unit 10. IC card processing unit 10 may include a microprocessor, memory, and other circuitry known in the art.

Power received from the transaction terminal 2 in the form of an energy transmitting alternating field is passed through inductive network 15 to power supply receiving circuit 8. Power supply receiving circuit 8 converts the received alternating field to a direct current (DC) power supply signal passed to IC card processing unit 10 to operate the electronics on the card 1. The inductive network 15, is modulated by signals fed back from the IC card processing unit 10 to operate an actuating unit 11 and a loading transistor 12. Operation and interaction of each of these elements will be discussed further below.

Transaction terminal 2 includes a processing unit 3 which is, in certain embodiments, adapted to communicate with a host system (e.g., an ATM network). Processing unit 3 generates data signals to be passed to the IC card L. These signals are first passed through a signal transmitting modulation circuit 4 and a transmitting circuit 5. The signals generated by the processing unit 3 are transmitted with power signals to the IC card 1 in an alternating field. signals are received from the IC card 1 through terminal contact circuit 6 and are input to the processing unit 3 via signal receiving demodulation circuit 7 which converts the data received into DC signals. Terminal processing unit 3, in one specific embodiment, is a signal processor which includes a CPU and signal processing capabilities. The signal processor may perform the functions of envelope detection and waveform shaping of signals received from the IC card 1. Transaction terminal 2 also has a card presence detector 54 which functions to alert the processing unit 3 when an IC card 1 has been inserted for operation. As will be discussed further below, this allows the transaction terminal 2 to avoid the emission of free electromagnetic radiation when a card is not inserted for use.

Figure 2:
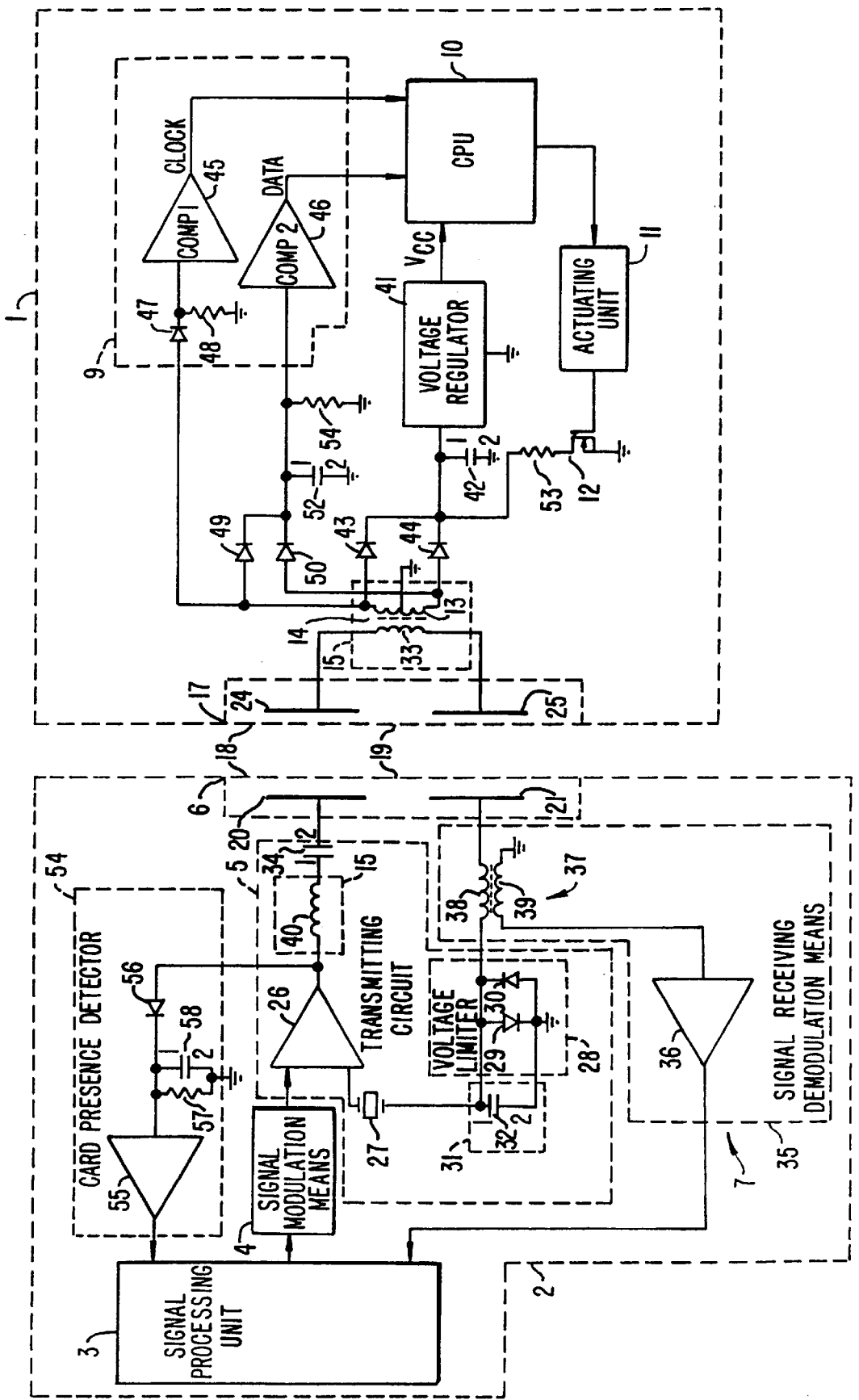
FIG. 2 is a circuit diagram of an embodiment of the terminal and card of FIG. 1.

Referring now to FIG. 2, a more detailed circuit diagram of one embodiment of the transaction terminal 2 and an IC card 1 is shown. The IC card 1 and transaction germinal 2 interface at the terminal and IC card contact circuitry 6, 17. The terminal contact circuitry 6 includes a pair of conductive contact plates 20, 21. IC card contact circuitry 6, 17 includes a corresponding pair of conductive contact plates 24, 25. Each of the conductive contact plates 20, 21, 24 and 25 may be, e.g., formed from conductive material such as copper sheeting disposed on a printed circuit board surface. The conductive contact plates 20, 21, 24, and 25 are coated with a layer of dielectric material selected to increase the capacitive coupling of the contact circuitry 6, 17. When IC card 1 is positioned proximate transaction terminal 2, the conductive contact plates 20, 21, 24 and 25 coated with the dielectric material form two capacitors 18, 19, electrically coupling the transaction terminal 2 to the IC card 1. The dielectric material serves to optimize the capacitive coupling between the IC card 1 and transaction terminal 2 and also serves to protect the contact plates 20, 21, 24 and 25 from damage or corrosion.

As discussed above, the value of the capacitance of the capacitive coupling interface formed between the IC card 1 and the transaction terminal 2 is limited by the size of the capacitive plates and by the mechanical gap which exists between the surfaces of the IC card contacts and the transaction terminal contacts. For example, the capacitance between two conductive plates having a surface area of 1 $cm^2$ and spaced apart by 10 $\mu m$ of air is equal to approximately 88.5 pF. Practically, however, separation between the conductive contact plates is generally no less than 0.02 mm (or 20 $\mu m$) because of misalignment between the IC card 1 and the transaction terminal 2. Also, separation and misalignment is caused by twisting or deformation of the IC card 1 through use and handling. Thus, in practice, the capacitance of the capacitive coupling interface formed between a card and terminal is approximately 44 $pF/cm^2$. Power transferred to a card is primarily related to the value of the capacitive interface, the size of the supply voltage, and the input frequency. Previous designers tended to attempt to increase the power transferred by increasing the size of the contacts and/or increasing the size of the supply voltage.

Previous capacitive card interfaces, accordingly, operated with minimal power transfer to control the size of the power source needed in the terminal. Embodiments of the present invention provide greater power to the IC card 1 without the need to use a dangerously large power supply voltage. This is accomplished, in part, through use of a matching capacitor 34 in the transaction terminal 2 positioned in series with one of the capacitive card interfaces (here, capacitor 18). The series coupling of capacitor 18 and matching capacitor 34 produces an increased common capacitance which may be calculated using the following formula: $C_{com}=(C_{18}*C_{34})/((C_{18}+C_{34}))$. The common capacitance, thus, is dominated by one of the two capacitors in series. The size of matching capacitor 34 may be selected to dominate the resulting common capacitance, thereby ensuring a relatively large capacitance in the coupling of the interface between the transaction terminal 2 and the IC card 1 despite any variations in the mechanical gap between the terminal and card. This serves to maximize the power transfer efficiency between the transaction terminal 2 and the IC card 1, allowing the IC card 1 to be provided with, e.g., greater processing power or greater storage capacity (functions which have been limited in the past).

The matching capacitor 34 couples capacitive interface 18 to the transmitting circuit 5 of the transaction terminal 2. Transmitting circuit 5, in one specific embodiment, is formed from an amplifier 26 configured to work in a generator mode and to oscillate to provide an energy-transmitting alternating field only when the contact surfaces 24, 25 of an IC card 1 are brought into contact with the corresponding contact surfaces 20, 21 of the transaction terminal 2. This feature will be discussed further below.

Transmitting circuit 5 also includes a quartz resonator 27 coupled to an input of amplifier 26. This quartz resonator 27 functions to increase the frequency stability of amplifier 26. A voltage limiter 28 and a current sink 31 are also provided in transmitting circuit 5. The voltage limiter 28 may be formed from two diodes 29, 30 coupled in parallel and in reverse polarity to each other. Voltage limiter 28 is selected to stabilize the amplitude of oscillations of the transmitting circuit 5. Current sink 31 may be coupled in parallel with the voltage limiter, and may be formed from a single capacitor 32. Capacitor 32 bypasses alternating current (AC) to ground and operates as a feedback divider for the input of amplifier 26. Transmitting circuit 5 is, thus, designed to function as a closed loop positive feedback circuit when an IC card 1 is in contact with the transaction terminal 2. Amplifier 26 does not produce an output unless a card is in contact with the terminal. This feature ensures that unnecessary power is not dissipated when a card is not in contact with the terminal. Further, electromagnetic and radio-frequency emissions are reduced.

The closed positive feedback loop is also used to generate a card presence signal which is input to the terminal processing unit 3. Card presence detector 54 is coupled to the output of amplifier 26. In one specific embodiment, the card presence detector 54 is formed from a diode 56, a resistor 57, and a capacitor 58 coupled between the output of amplifier 26 and the input of voltage comparator 55. The diode, resistor and capacitor detect when free-running oscillation of amplifier 26 begins (indicating establishment of a closed loop caused by the insertion of an IC card 1). Voltage comparator 55 provides a card presence signal to an input of terminal processing unit 3 once oscillation of amplifier 26 commences. This card presence signal may be used by the terminal processing unit 3 to begin bi-directional data transfer with the IC card 1. For example, the card presence signal may initiate a card/terminal data transfer protocol including protocol selection or the transfer of security information.

Signals generated by the terminal processing unit 3 are passed through a signal modulation circuit 4 to transmitting circuit 5 for output to the IC card 1. Signal modulation circuit 4 is designed to transfer the serial digital signals produced by the terminal processing unit 3 to signals suitable to modulate oscillation of amplifier 26. This causes amplifier 26 to generate a serial waveform for transmission to the IC card 1. The signal modulation circuit 4 converts data output from the terminal processing unit 3 into a serial code and supplies it to an input of amplifier 26. This serves to modulate the amplitude of the free running oscillations of the energy-transmitting alternating field input to the IC card 1.

Transaction terminal 2 also includes a signal receiving demodulation circuit 7 which includes a current detecting circuit 35 containing an amplifier 36 and a current transformer 37, the primary coil 38 of which is serially connected to the positive feedback circuit input to the transmitting circuit 5. The secondary coil 39 of the current transformer 37 is coupled to the amplifier 36, whose output is connected to the terminal processing unit 3. The voltage output from the amplifier 36 to the terminal processing unit corresponds to the serial data received from the IC card 1.

The primary coil 38 of the current transformer 37 may be implemented in one of several ways. In one embodiment, the primary coil 38 of the current transformer 37 is a part of an electric wire passing through a central hole of a toroid-like magnetic core and the secondary coil 39 is wound N times (N: a positive integer) around the magnetic core. A voltage generated between opposite ends of the secondary coil 39 is then outputted as the detection output signal to the amplifier 36.

In a second embodiment, the primary coil 38 of the current transformer 37 wound on a toroid-like magnetic core is inserted serially into the positive feedback circuit of the transaction terminal 2, and the secondary coil 39 of the current transformer 37, wound on the same magnetic core, is coupled to amplifier 36. A voltage generated between opposite ends of the secondary coil 39 is, thus, output as the serial signal provided to the terminal processing unit 3.

The IC card 1 receives power and data from the transaction terminal 2 via capacitive interface 18. An inductive network 15 is connected in series with the capacitive interfaces 18, 19. The inductive network 15 is selected to form a series resonant circuit to cancel the reactance of the capacitive interface and to obtain a desired maximum power transfer from the transaction terminal 2 to the IC card 1. In one embodiment, shown in FIG. 2, the inductive network is implemented as a transformer 14 with first and second inductive coils 13, 33 wound on a common core. In a second embodiment, which will be discussed further in conjunction with FIG. 3, the inductive component of the series resonant circuit is provided using a simple inductor or inductive coil 40 which may be placed in the transaction terminal 2.

The embodiment shown in FIG. 2 has been found to provide preferable power transfer characteristics as the active component of the positive feedback path of the transaction terminal 2 is reduced by the impedance matched by the transformer 14 in the IC card 1. The inductance of transformer 14 functions to cancel the capacitance of the interface between the card and terminal. The active resistance of the first inductive coil 33 of the transformer 14 is small, therefore the quality of the series resonant circuit is high, maximizing power transfer. The embodiment of FIG. 3 has been found to provide highly desirable performance characteristics while being relatively simple and inexpensive to fabricate as the IC cards do not each require a transformer on the card. Inductance, instead, is provided in the transaction terminal 2.

In a similar vein, characteristics of the series resonant circuit formed between the transaction terminal 2 and the IC card 1 are also affected by the choice of the inductance of the current transformer 37. The inductance of the current transformer 37 inserted into the mentioned above series resonant circuit is taken into consideration in the process of selecting the parameters of the transformer 14 used in the embodiment of FIG. 2, or the inductive coil 40 used in the embodiment of FIG. 3, despite the inductance of the current transformer 37 being extremely small.

Power received by the IC card 1 is input to the IC card processing unit 10 via a voltage regulator 41 and a filtering capacitor 42. The input signal is also passed through rectifying diodes 43, 44 coupled in parallel and in reverse polarity to each other. The voltage regulator 41, rectifying diodes 43, 44, and filtering capacitor 42 are all selected to provide an appropriate voltage (Vcc) to the IC card processing unit 10. The IC card processing unit 10 may include a central processor, memory, and other circuitry.

Data signals received by the IC card 1 are input to the IC card processing unit 10 via a signal receiving input circuit 9. Signal receiving input circuit 9 is formed from a voltage comparator 45 designed to output a clock signal to the IC card processing unit 10, and a second voltage comparator 46 for outputting data received from the transaction terminal 2 to the IC card processing unit 10. A diode 47 and a resistor 48 are positioned at the input of the first voltage comparator 45 to detect a clock signal received from the transaction terminal. Diodes 49, 50, resistor 51, and capacitor 52 are positioned to detect data signals received from the transaction terminal.

The IC card processing unit 10 is also coupled to send data to the transaction terminal 2. Data output from the IC card processing unit 10 passes through an actuating unit 11 for transformation into a serial code. The serial code output from the actuating unit 11 is supplied to a loading transistor 12. For the embodiments depicted in FIGS. 2 and 3, the loading transistor is turned on when the serial data from the actuating unit is a logic "1" and is turned off when the serial data is a logic "0". When the loading transistor 12 is turned on, a load resistor 53 is added to the load of the IC card 1. As a result, the high frequency current flowing through the coil 33 increases. Similarly, referring briefly to the embodiment of FIG. 3, a high frequency current flowing through the diode bridge 16 increases. When the loading transistor 12 is turned off, the high frequency current flowing through the coil 33 (or diode bridge 16, respectively) decreases. This high frequency current is detected by the coil 39 of the transaction terminal 2 and is converted by the amplifier 36 into a high frequency voltage input to the transaction terminal processing unit 3.

The result is an ability to transfer power and bi-directional data signals over the same pair of contacts while providing sufficient magnitudes of power to enable use of IC cards having large memories. In one specific embodiment, the IC card 1 is supplied with an input voltage of 8 Volts DC and a current magnitude of 200 mA, magnitudes not available in previous card designs.

Operation of embodiments of the present invention will now be described by referring to FIG. 2. When IC card 1 is brought into contact with the transaction terminal 2, the positive feedback circuit of amplifier 26 becomes a closed loop circuit via capacitive interfaces 18 and 19, matching capacitor 34, first inductive coil 33, primary coil 38 and quartz resonator 27. Similarly, referring briefly to the embodiment depicted in FIG. 3 the positive feedback circuit of amplifier 26 becomes a closed loop circuit via inductive coil 40, capacitive interfaces 18 and 19, matching capacitor 34, diode bridge 16, primary coil 38 and quartz resonator 27.

A series capacitance is formed by mating parallel plates 20 and 24, 21 and 25. As a result, amplifier 26 begins to oscillate in generator mode with a fixed amplitude output to provide an energy-transmitting alternating field through transformer 14 (in the embodiment of FIG. 2) or through diode bridge 16 (see the embodiment of FIG. 3) to IC card 1. In the embodiment of FIG. 2, the use of transformer 14 in conjunction with diodes 43, 44 provide full-wave rectifying of the received signal. Capacitor 42 smoothes and filters any high frequency voltage on the signal while voltage regulator 41 supplies the necessary supply voltage (e.g., Vcc) to IC card processing unit 10 and any other circuitry provided on IC card 1.

Figure 3:
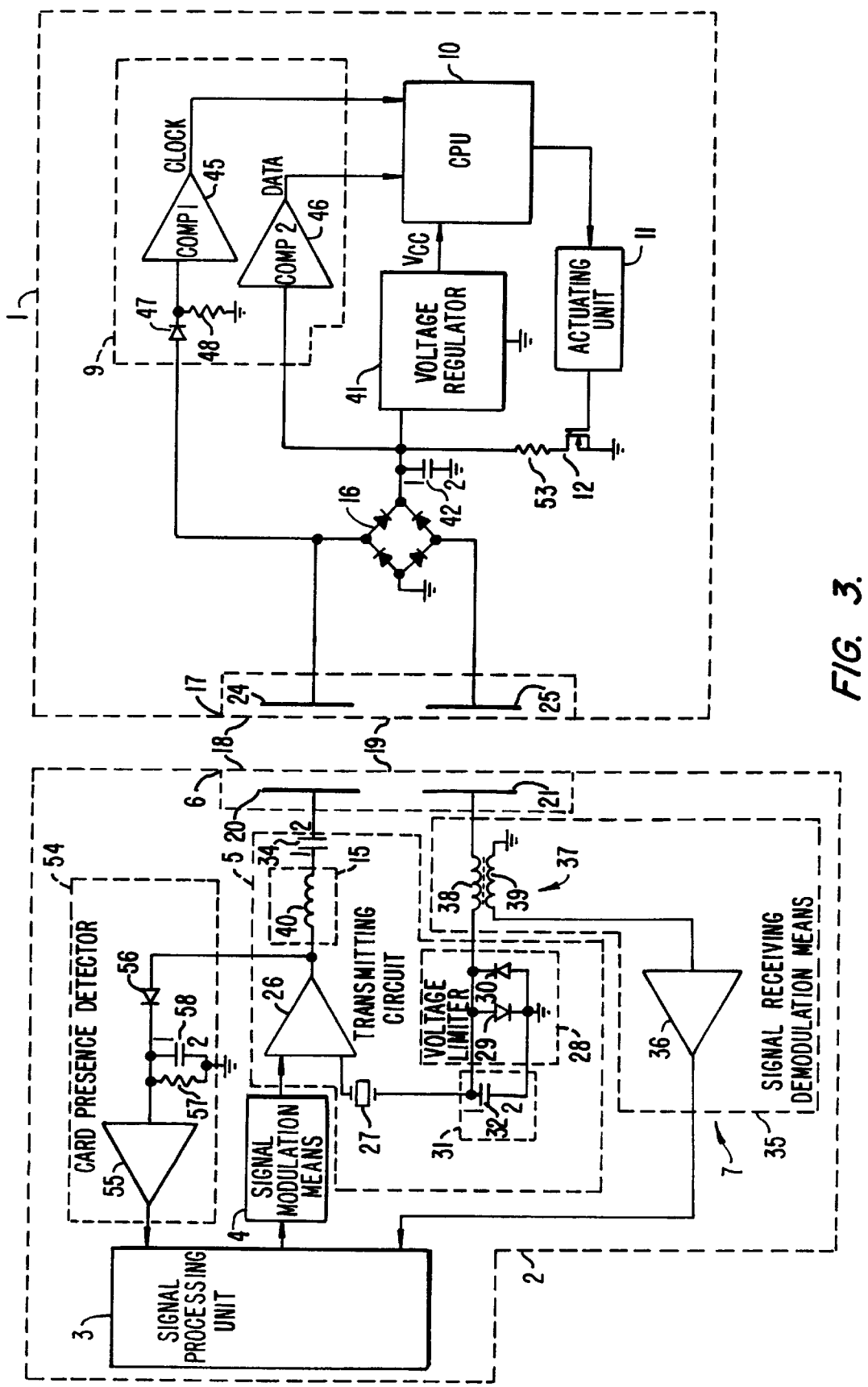
FIG. 3 is a circuit diagram of a further embodiment of the terminal and card of FIG. 1.

In the embodiment according to FIG. 3 where an inductive coil 40 is incorporated into transaction terminal 2 and a diode bridge 16 is supplied on the IC card 1, capacitor 42 is used to provide some preliminary smoothing of the received signal by filtering high frequency voltage which may exist on the signal. Voltage regulator 41 is used to further smooth the signal and to filter AC signals received, from the transaction terminal 2. Voltage regulator 41 also provides the needed supply voltage to the IC card processing unit 10 and any other circuitry provided on the IC card 1.

At approximately the same time that amplifier 26 begins oscillating, card presence detector 54 generates a signal input to transaction terminal processing unit 3. This signal indicates that an IC card 1 has been inserted into the terminal, and that the terminal should commence interaction with the card. This signal received from the card presence detector, in one preferred embodiment, places the transaction terminal processing unit 3 in a waiting state where the processing unit is waiting for data to be received from the IC card 1.

The free running oscillation of amplifier 26 also causes an alternating field to be passed to IC card 1. The frequency of the free running energy-transmitting alternating field is used as the clock frequency for IC card processing unit 10 by passing from the IC card contacts 24, 25 through diode 47 and comparator 45 to a clock input of the IC card processing unit 10. IC card processing unit 10, in a specific embodiment, follows a communication protocol routine stored in, e.g., a read-only memory (ROM) in the processing unit. This routine may cause the IC card processing unit 10 to transmit specified data to the transaction terminal 2, such as security information, encryption data, and card or card-holder identification data. This information is transmitted as follows.

Data generated by the IC card processing unit 10 is transformed into a serial code by the actuating unit 11 and is then supplied to the loading transistor 12. It is assumed that the loading transistor is turned on when data is "1" and is turned off when data is "0". When the loading transistor 12 is turned on, there results in the addition of the load resistor 53. Namely, a load when viewed from the side of second plurality of capacitive coupling means 17 increases. As a result a high frequency current flowing through the coil 33 increases (in the embodiment of FIG. 2), or, in the embodiment of FIG. 3, the high frequency current flowing through the diode bridge 16 increases. When the loading transistor 12 is turned off, the high frequency current flowing through the coil 38 (or diode bridge 16 of FIG. 3) decreases. This high frequency current is detected by the coil 39 and converted by amplifying means 36 into a high frequency voltage. Thereafter, the high frequency voltage is subjected to envelope detection and waveform shaping by the terminal processing unit 3. As mentioned above, terminal processing unit 3 may include signal processing functions known to those skilled in the art (such as envelope detection and waveform shaping). The received data may then be processed by the terminal processing unit 3 and may be forwarded to, e.g., the ATM network or processed locally.

When the data received in the transaction terminal 2 from the IC card 1 is processed by the terminal (and, in certain embodiments, is first deemed to be valid), the terminal starts to transmit data to the IC card 1. The signal modulation circuit 4 converts data signals from the transaction terminal processing unit into a serial code and supplies the serial coded data to the second input of amplifier 26. This provides amplitude modulation of the free running oscillations of the energy-transmitting alternating field.

Features of the invention allow the amplitude modulation of the transmitted signal to be varied by appropriate selection of the RC-parameters of circuit elements contained on the IC card 1 (i.e., by selecting the sizes and characteristics of diodes 49, 50, resistor 51, and capacitor 52). Similarly, envelope detection and waveform shaping is provided by selection of the comparator 46 and by the data sent to the IC card processing unit 10. The amplitude of envelope modulation is significantly less than the amplitude of free running oscillations of the energy-transmitting alternating field and does not influence on the power transfer to the IC device module 1.

Figure 4:
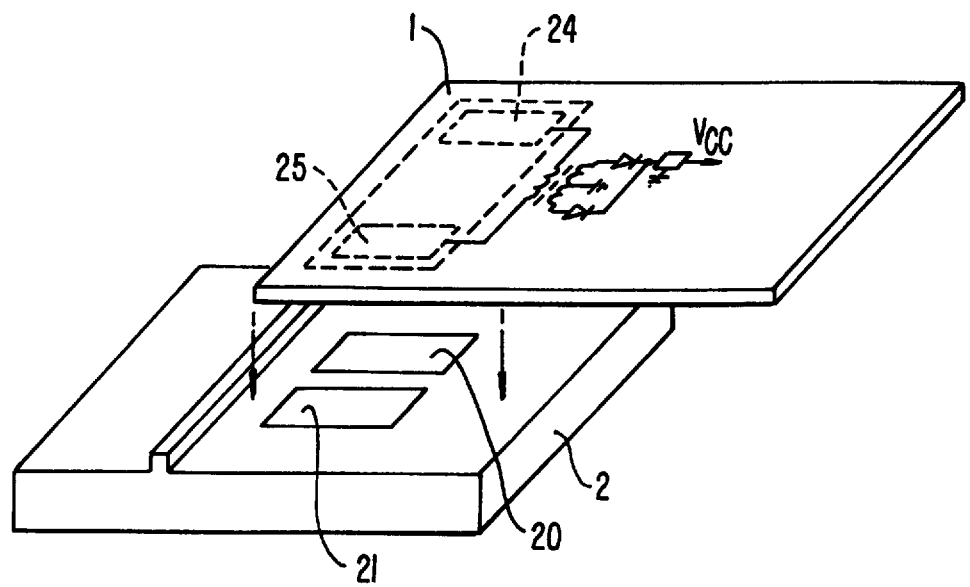
FIG. 4 is a perspective view of the terminal and card of FIG. 1.

Referring briefly to FIG. 4, a perspective view of an IC card 1 as it is coupled to a host unit 2 is shown. As shown, conductive contact plates 20, 21 of the host unit are positioned to couple with conductive contact plates 24, 25 of the IC card. A user may simply position an IC card 1 over the host unit 2 to establish contact between the devices.

Figure 5:
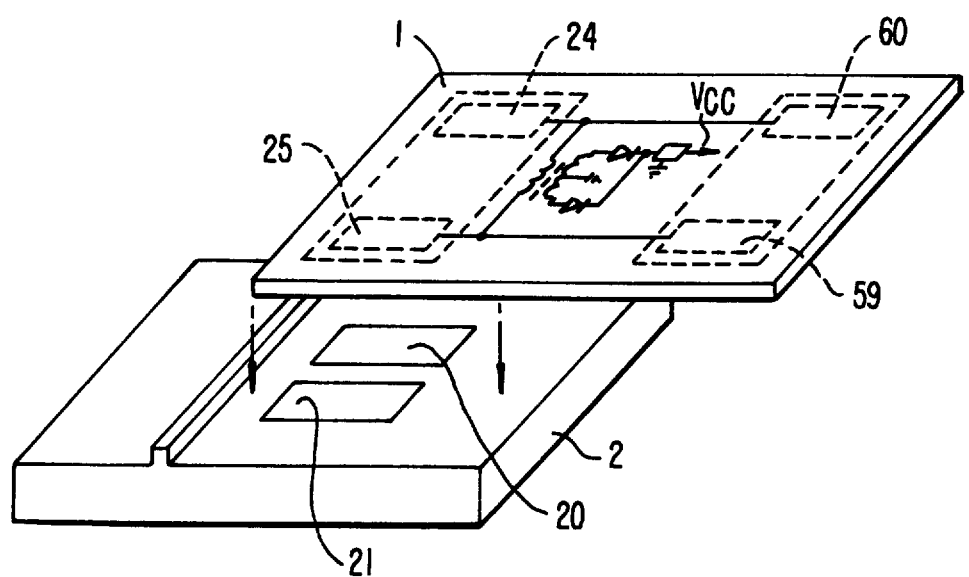
FIG. 5 is a perspective view of a further embodiment of a card in use with the terminal of FIG. 1.

An alternative embodiment of an IC card 1 is illustrated in FIG. 5. In this alternative embodiment, the IC card 1 includes additional conductive plates 59 and 60 arranged on an opposite side of the IC card 1 from contacts 24, 25. These additional conductive contact plates 59, 60 are coupled electrically in pairs with contacts 24, 25. In this case the IC card 1 has a symmetric arrangement of capacitive coupling interfaces (59, 60 and 24, 25) so that a user can insert the card on either side to produce the same operation as described in conjunction with FIGS. 1–3. This feature allows an IC card user to always properly insert an IC card into a transaction terminal, even under low light or other conditions which would otherwise cause the user to fumble with the card.

As will be appreciated by those familiar with the art, the present invention may be embodied in other specific forms without departing from the spirit or essential characteristics thereof. For example, although an ATM terminal and a smart card have been described, those skilled in the art will recognize that a number of other portable devices and host units may be implemented using features of the present invention. For example, cards compliant with Personal Computer Memory Card Industry Association (PCMCIA) requirements may be designed using features of the invention to capacitively mate with, e.g., a personal computer.

Accordingly, the disclosure of the invention is intended to be illustrative, but not limiting, of the scope of the invention which is set forth in the following claims.

What is claimed is:

1. A power and data transfer system, comprising:

a portable device having first contact circuitry, including a first pair of contact pads, and a processing unit, coupled to said first contact circuitry;

a host unit having second contact circuitry, including a second pair of contact pads, and a host processing unit, coupled to said second contact circuitry;

said first and second contact circuitry adapted to form a capacitive interface when said portable device is positioned proximate said host unit; and said capacitive interface transmitting power signals from said host unit to said portable device and transmitting bi-directional data signals between said portable device and said host unit;

wherein said power signals and said bi-directional data signals are transmitted using the same capacitive interface;

wherein at least one of said contact pads has an outer surface covered with a dielectric material.

2. The power and data transfer system of claim 1, wherein said host unit further comprises an oscillation device coupled to said second contact circuitry, said oscillation device adapted to oscillate when a portable device is positioned proximate said second contact circuitry.

3. The power and data transfer system of claim 3, further comprising a portable device presence detector coupled to said oscillation device and adapted to generate a portable device presence signal when said oscillation device begins to oscillate.

4. The power and data transfer system of claim 3, wherein said portable device presence signal causes said host processing unit to transmit data to said portable device.

5. The system of claim 2 further comprising an oscillator formed from said oscillation device in said host unit and a portion of said portable device.

6. The system of claim 5 wherein said portion of said portable device comprises a capacitance for completing a feedback loop in said oscillator.

7. The power and data transfer system of claim 1, wherein said host unit is an automated teller machine and said portable device is a smart card.

8. A power and data transfer system, comprising:

a portable device having first contact circuitry, including a first pair of contact pads, and a processing unit, coupled to said first contact circuitry;

a host unit having second contact circuitry, including a second pair of contact pads, and a host processing unit, coupled to said second contact circuitry;

said first and second contact circuitry adapted to form a capacitive interface when said portable device is positioned proximate said host unit; and said capacitive interface transmitting power signals from said host unit to said portable device and transmitting bi-directional data signals between said portable device and said host unit;

wherein said power signals and said bi-directional data signals are transmitted using the same capacitive interface;

wherein at least one of said contact reads has an outer surface covered with a dielectric material;

wherein said second contact circuitry further comprises at least a first matching capacitor having a capacitance selected to decrease a capacitance of said capacitive interface between said host unit and said portable device.

9. A power and data transfer system, comprising:
- a portable device having first contact circuitry, including a first pair of contact pads, and a processing unit, coupled to said first contact circuitry;
- a host unit having second contact circuitry, including a second pair of contact pads, and a host processing unit, coupled to said second contact circuitry;
- said first and second contact circuitry adapted to form a capacitive interface when said portable device is positioned proximate said host unit; and
- said capacitive interface transmitting power signals from said host unit to said portable device and transmitting bi-directional data signals between said portable device and said host unit;
- wherein said power signals and said bi-directional data signals are transmitted using the same capacitive interface;
- wherein at least one of said contact lads has an outer surface covered with a dielectric material;
- an inductive network, coupled to said first contact circuitry;
- power supply receiving circuitry coupled to receive power signals from said inductive network and to provide rectified electric current power signals to said processing unit of said portable device; and
- signal receiving circuitry coupled to receive data signals from said inductive network and to provide detected and shaped data signals to said processing unit of said portable device.

10. The power and data transfer system of claim 9, wherein said inductive network is formed from a transformer having first and second inductive coils wound on a common core, said first inductive coil coupled to said first contact circuitry, and said second inductive coil coupled to said power supply receiving circuitry and to said signal receiving circuitry.

11. The power and data transfer system of claim 9, wherein said inductive network is formed from a diode bridge having a first terminal coupled to said signal receiving circuitry and a second terminal coupled to said power supply receiving circuitry.

12. A smart card adapted for use with a terminal, the terminal having a pair of conductive contacts covered with a layer of dielectric material the smart card comprising:
- a second pair of conductive contacts, covered with a layer of dielectric material;
- a transformer having first and second inductive coils wound on a common core, said first inductive coil coupled to said second pair of conductive contacts and said second inductive coil coupled to a power circuit, to a signal receiving circuit, and to a signal transmitting circuit;
- said power circuit receiving alternating current signals from said second inductive coil and generating a direct current power signal for input to a processing unit;
- said signal receiving circuit receiving data signals from said second inductive coil and generating demodulated data and clock signals for input to said processing unit; and
- said signal transmitting circuit receiving data signals from said processing unit and passing said data signals to said second inductive coil for transmission to said terminal over said second pair of conductive contacts.

13. A smart card adapted for use with a terminal having a first pair of conductive contacts, the smart card comprising:
- a second pair of conductive contacts, at least one of said first and second contacts being covered with a layer of dielectric material;
- a diode bridge coupled to receive power signals from said second pair of conductive contacts and to send and receive data signals over said second pair of conductive contacts;
- said diode bridge having a first terminal coupled to a signal receiving circuit, said signal receiving circuit receiving alternating current signals from said diode bridge and generating demodulated data and clock signals for input to a processing unit;
- said diode bridge having a second terminal coupled to a power reciving circuit, said power receiving circuit receiving alternating current signals from said diode bridge and generating a direct current power signal for input to said processing unit;
- wherein said diode bridge and a capacitance of said second pair of contact pads are configured to form a part of a feedback loop of an oscillator in said terminal; and
- a signal sending circuit, coupled to receive data signals from said processing unit and to pass said data signals to said diode bridge for transmission to said terminal over said second pair of conductive contacts.

* * * * *

UNITED STATES PATENT AND TRADEMARK OFFICE
CERTIFICATE OF CORRECTION

PATENT NO.    : 5,847,447
DATED         : December 8, 1998
INVENTOR(S)   : Alexander Rozin et al.

It is certified that error appears in the above-identified patent and that said Letters Patent is hereby corrected as shown below:

On the title page item [54] and in column 1, lines 1-3:
CAPCITIVELY COUPLED BI-DIRECTIONAL DATA AND POWER TRANSMISSION SYSTEM should read as follows:

CAPACITIVELY COUPLED BI-DIRECTIONAL DATA AND POWER TRANSMISSION SYSTEM

Signed and Sealed this

Thirtieth Day of March, 1999

*Attest:*

*Attesting Officer*

Q. TODD DICKINSON

*Acting Commissioner of Patents and Trademarks*